(12) United States Patent
Thorpe

(10) Patent No.: US 11,285,060 B2
(45) Date of Patent: Mar. 29, 2022

(54) SEAT ASSEMBLY

(71) Applicant: Autochair Limited, Alfreton (GB)

(72) Inventor: Andrew Richard Thorpe, Alfreton (GB)

(73) Assignee: Autochair Limited, Alfreton (GB)

(*) Notice: Subject to any disclaimer, the term of this patent is extended or adjusted under 35 U.S.C. 154(b) by 0 days.

(21) Appl. No.: 17/097,324

(22) Filed: Nov. 13, 2020

(65) Prior Publication Data

US 2021/0137758 A1    May 13, 2021

(30) Foreign Application Priority Data

Nov. 13, 2019   (GB) ..................................... 1916523

(51) Int. Cl.
*A61G 5/10*        (2006.01)
*A61G 5/12*        (2006.01)
*B62J 1/12*        (2006.01)
*B62J 1/14*        (2006.01)

(52) U.S. Cl.
CPC ......... *A61G 5/1059* (2013.01); *A61G 5/1091* (2016.11); *A61G 5/122* (2016.11); *A61G 5/125* (2016.11); *B62J 1/12* (2013.01); *B62J 1/14* (2013.01)

(58) Field of Classification Search
CPC ...... A61G 5/1059; A61G 5/125; A61G 5/122; A61G 5/1091; A61G 5/04; A61G 5/1072; B60N 2/30; B60N 2/787; B60N 2/7005; B60N 2002/684; B60N 2/163; B60N 2/146; B62J 1/08; B62J 1/14; B62J 1/28; B62J 1/12; B62K 5/003

USPC ............... 297/440.14, 440.22, 195.1, 195.13
See application file for complete search history.

(56) References Cited

U.S. PATENT DOCUMENTS

| 2,376,713 | A | * | 5/1945 | Murrell | .................... | B62J 1/167 |
| | | | | | | 248/214 |
| 3,815,956 | A | | 6/1974 | Bocksch et al. | | |
| 4,170,368 | A | | 10/1979 | Southward et al. | | |
| 5,020,624 | A | | 6/1991 | Nesterick et al. | | |
| 6,164,725 | A | * | 12/2000 | Santa Cruz | ................ | B62J 1/28 |
| | | | | | | 297/411.29 |
| 6,227,510 | B1 | * | 5/2001 | McMullen, Sr. | ........ | A47C 7/68 |
| | | | | | | 248/230.5 |

(Continued)

FOREIGN PATENT DOCUMENTS

| FR | 2371188 A1 | 6/1978 |
| FR | 2699129 A1 | 6/1994 |
| GB | 2542556 A | 3/2017 |

*Primary Examiner* — Milton Nelson, Jr.
(74) *Attorney, Agent, or Firm* — Young Basile Hanlon & MacFarlane, P.C.

(57) ABSTRACT

A seat assembly for a mobility scooter has a seat portion for supporting an operator of the mobility scooter in use and a yoke arranged to receive the seat portion. The yoke has a mounting formation for mounting to a support member of the mobility scooter such that the yoke is removably mounted atop the support member and the seat portion is removably mounted atop the yoke in use. The yoke also has an attachment formation for releasable attachment of an arm-rest and a back-rest for the seat portion. The seat portion can be lifted off the yoke as a first component. The yoke can be lifted off the support member as a further component when removing the seat assembly from the mobility scooter.

25 Claims, 8 Drawing Sheets

(56) References Cited

U.S. PATENT DOCUMENTS

| | | | | |
|---|---|---|---|---|
| 7,131,696 B1* | 11/2006 | Chen | ............... | B60N 2/245 |
| | | | | 297/336 |
| 7,278,672 B2* | 10/2007 | Lin | ............... | B60N 2/146 |
| | | | | 296/63 |
| 9,999,562 B1* | 6/2018 | Yeh | ............... | A61H 3/04 |
| 2001/0040352 A1* | 11/2001 | Wang | ............... | A63C 17/01 |
| | | | | 280/87.01 |
| 2004/0026949 A1 | 2/2004 | Lin | | |
| 2004/0088941 A1* | 5/2004 | Boots | ............... | A47B 47/027 |
| | | | | 52/655.1 |
| 2006/0237946 A1* | 10/2006 | Hutson | ............... | B62J 1/28 |
| | | | | 280/288.4 |
| 2010/0187882 A1 | 7/2010 | Chen | | |
| 2019/0168835 A1 | 6/2019 | Hernandez | | |

* cited by examiner

SEAT ASSEMBLY

CROSS-REFERENCE TO RELATED APPLICATION

This application claims priority to United Kingdom Application Patent Serial No. GB 1916523.2, filed Nov. 13, 2019, the entire disclosure of which is hereby incorporated by reference.

TECHNICAL FIELD

The present invention relates to the seat assembly for a vehicle, particularly to a seat assembly for a mobility scooter.

BACKGROUND

US 2004/0026949 A1 shows a prior art mobility scooter. The scooter comprises a seat 5 for the user to sit on during operation of the vehicle. The seat 5 is attached to the vehicle by a pillar or the like, extending from the base of the vehicle. The seat 5 is permanently attached to a headrest and a pair of armrests.

The inventor has found numerous drawbacks with the prior art. If removal of the seat is required (for example, when loading into the back of a vehicle), the user must detach the seat from the pillar, thus requiring access to the underside of the seat to provide detachment from the pillar. For example, the user may be required to bend or kneel down to access or see any fasteners or the like attaching the seat to the pillar. The area beneath the seat may also be restricted by other portions of the vehicle, for example, the motor or battery. This may pose issues for those with limited or impaired mobility (i.e. the primary users of the vehicle).

In some prior art scooters, the seat is rotatable via a mechanism, for example, to allow the user to enter/exit the vehicle, or allow them to sit at a table. Similarly, the seat rotation mechanism is located beneath the seat, which may pose accessibility issues for the user. Additionally, the seat rotation mechanism may increase the complexity of attaching or detaching the seat to/from the vehicle.

The weight and size of the seat assembly, including integral arm rests and backrest, also poses issues for those with reduced mobility. Detaching and lifting the seta requires a two-handed operation and can cause straining or injury to the operator.

SUMMARY

It is an aim of the present invention to overcome or ameliorate one or more of the above problems, for example, to provide a modular and easy to disassemble seating assembly.

According to a first aspect of the invention, there is provided a seat assembly for a mobility scooter comprising: a seat portion for supporting an operator of the vehicle mobility scooter in use; a yoke arranged to receive the seat portion and comprising a mounting formation for mounting of the yoke to a support member of the mobility scooter such that the yoke is removably mounted atop the support member and the seat portion is removably mounted atop the yoke in use, where the yoke comprises one or more attachment formation for releasable attachment of at least one of an arm-rest or and a back-rest for the seat portion; and where the seat portion is liftable off the yoke as a first component and the yoke is liftable off the support member as a further component when removing the seat assembly from the mobility scooter.

According to a second aspect of the invention, there is provided: a seat assembly for a mobility scooter comprising: a base portion configured to connect the scooter in use; a seat portion for supporting an operator of the vehicle in use, the seat portion removably mounted to the pillar and rotatable relative thereto about an axis when mounted; the pillar and seat portion comprising a securing mechanism configured to selectively prevent relative rotation therebetween; and where the securing mechanism is configured such that when the securing mechanism is engaged, axial movement of the seat portion in an axial direction is permitted.

The alignment formation may be provided on the pillar and the recess may be open in an upwardly facing direction.

The alignment formation may take the form of a recess or channel, e.g. extending in the axial direction. The recess/channel may be elongate.

The engagement member/mechanism may comprise a handle to permit the user to actuate the engagement mechanism away from the alignment formation.

There may be provided a mobility scooter comprising the seat assembly of either the first or second aspect.

Further optional features of the first and second aspects are disclosed in appended claims 2-13 and 15-25. It is not intended that those optional features are mutually exclusive to either the first or second aspect and, where practicable, any or any combination of those features may be applied to either the first or second aspect unless such a combination is specifically excluded in the following description.

BRIEF DESCRIPTION OF THE DRAWINGS

Practicable examples of the invention are described in further detail below with reference to the accompanying drawings, of which.

DETAILED DESCRIPTION

Figure 1A:
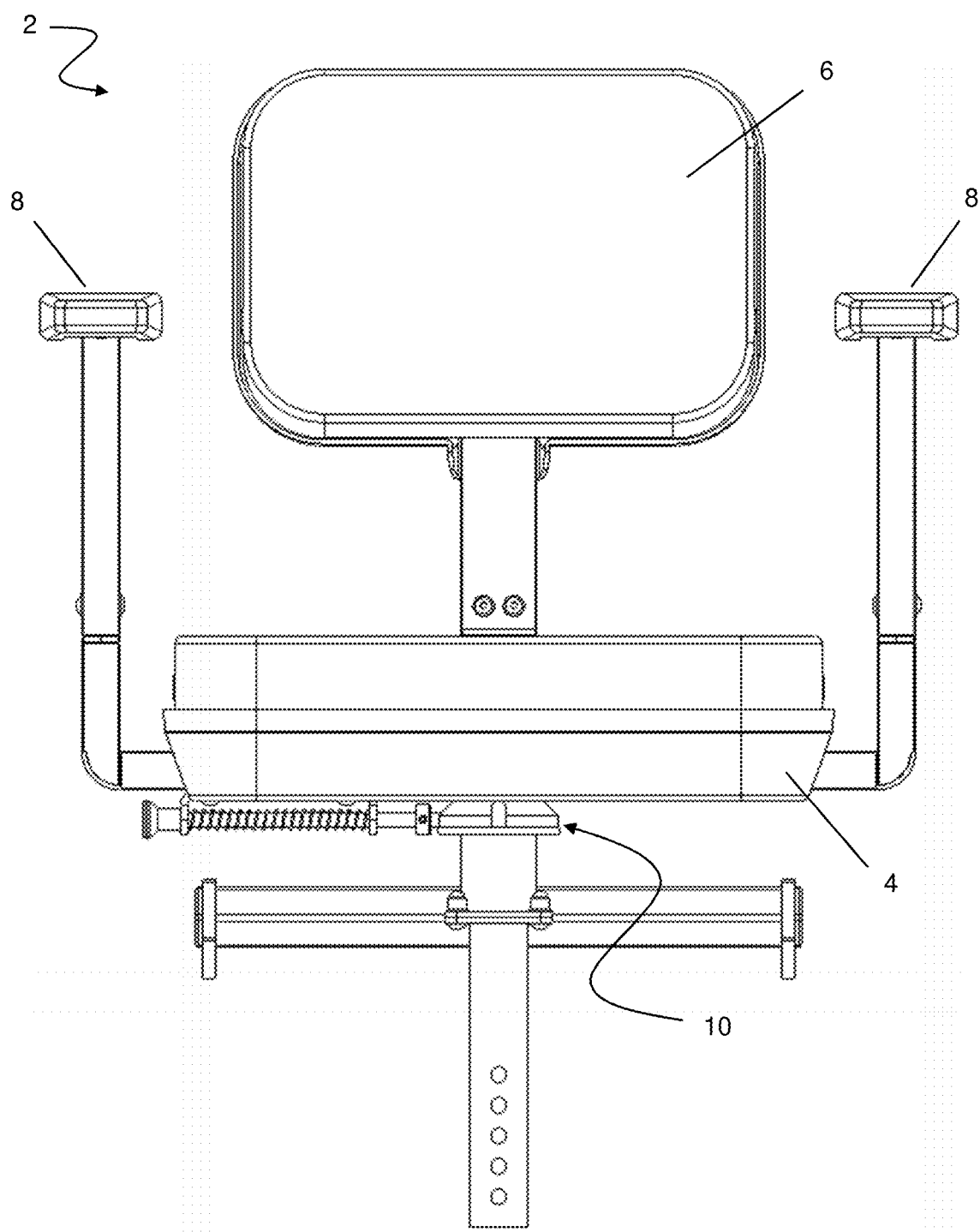
FIG. 1a shows a front view of a seat assembly.
Figure 1B:
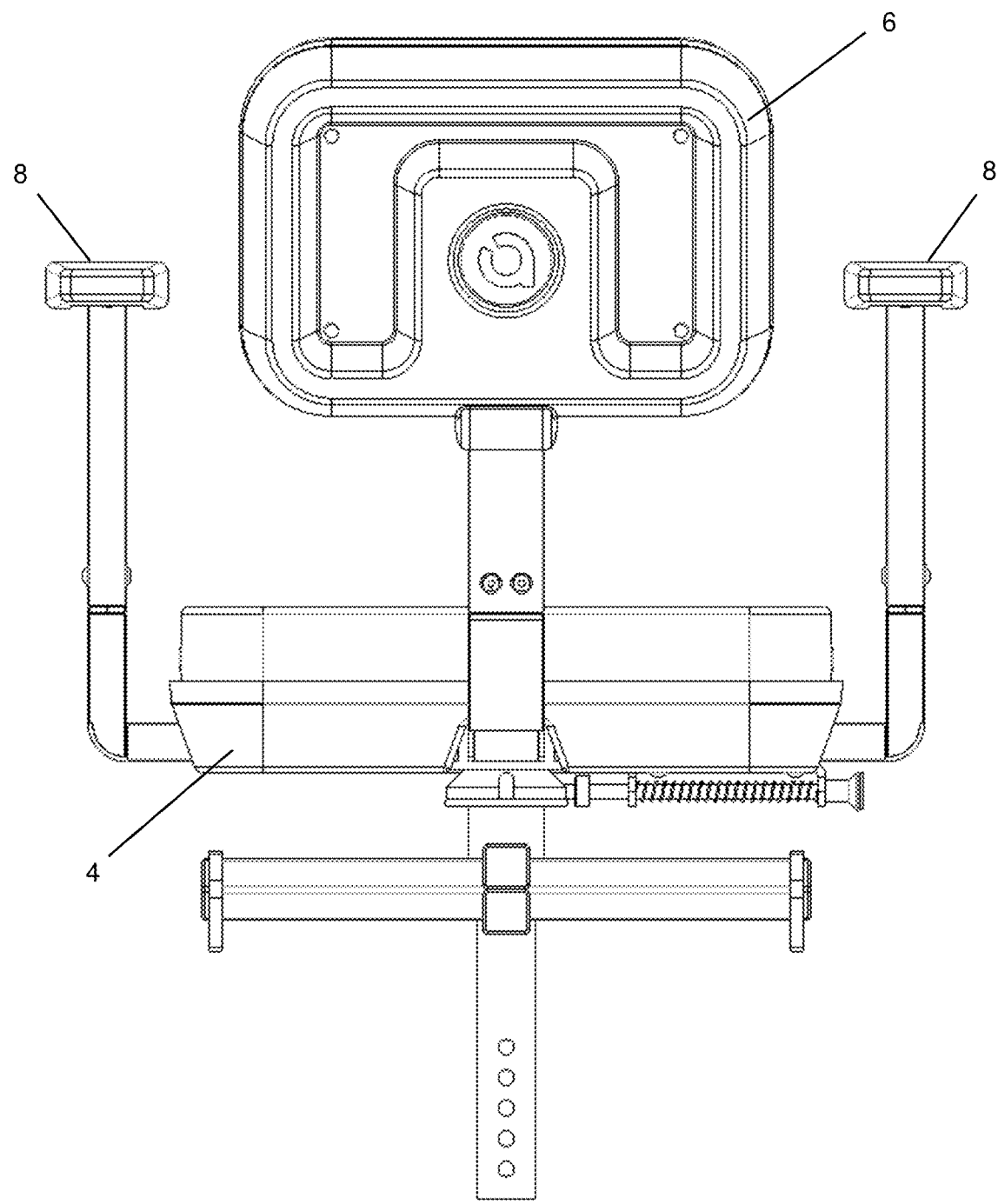
FIG. 1b shows a rear view of a seat assembly
Figure 2:
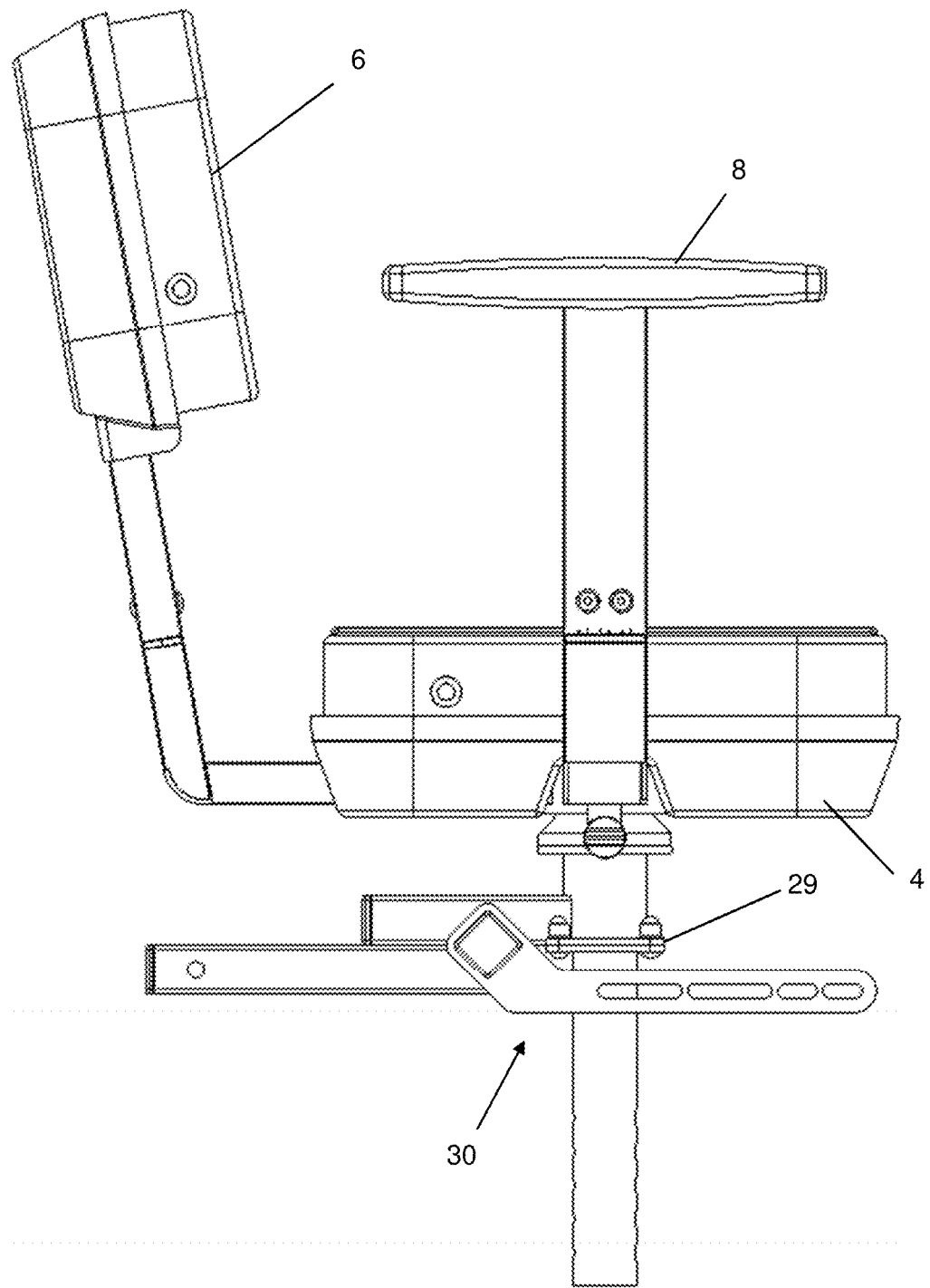
FIG. 2 shows a side view of the seat assembly.
Figure 3A:
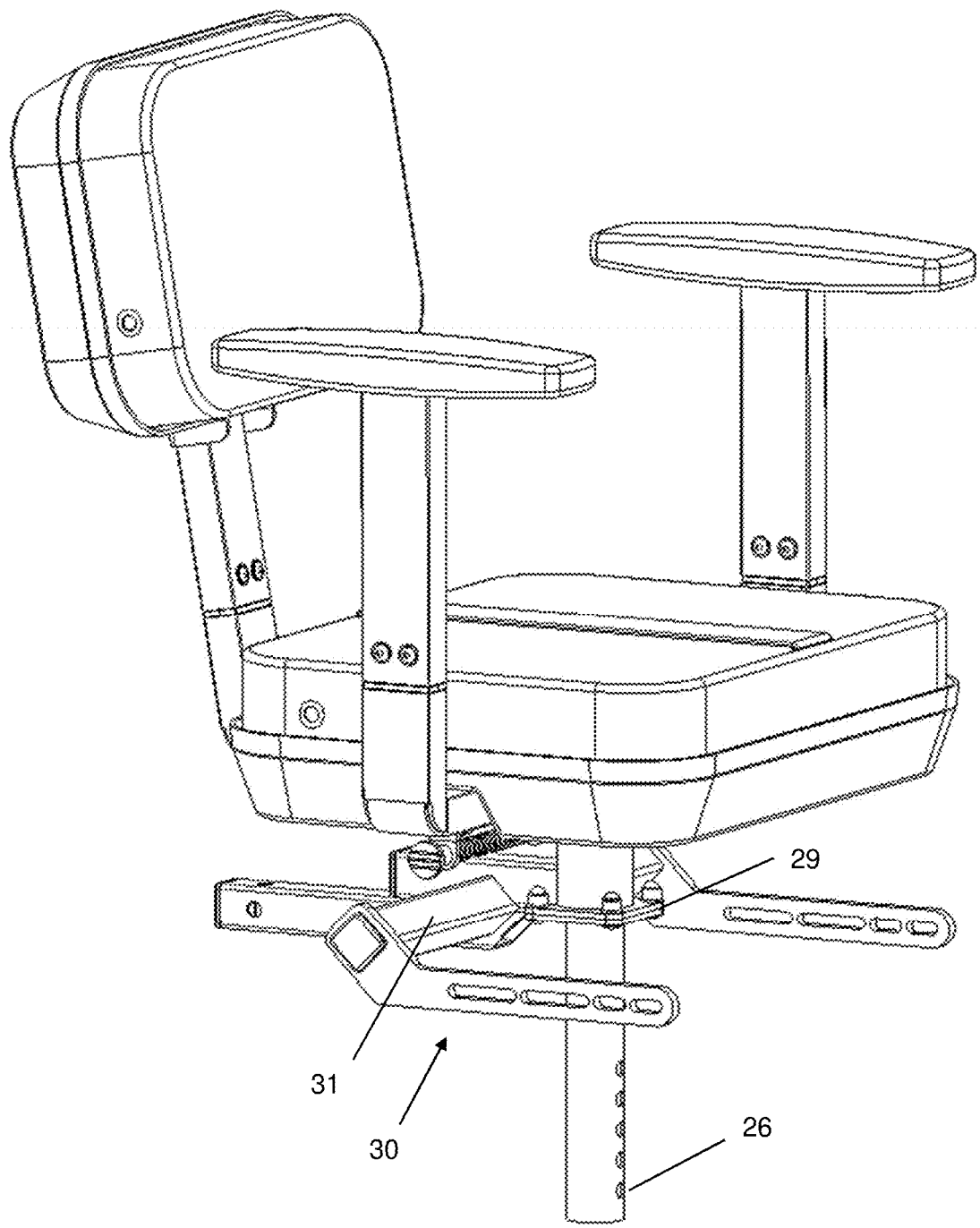
FIG. 3a shows a three-dimensional view of the seat assembly.
Figure 3B:
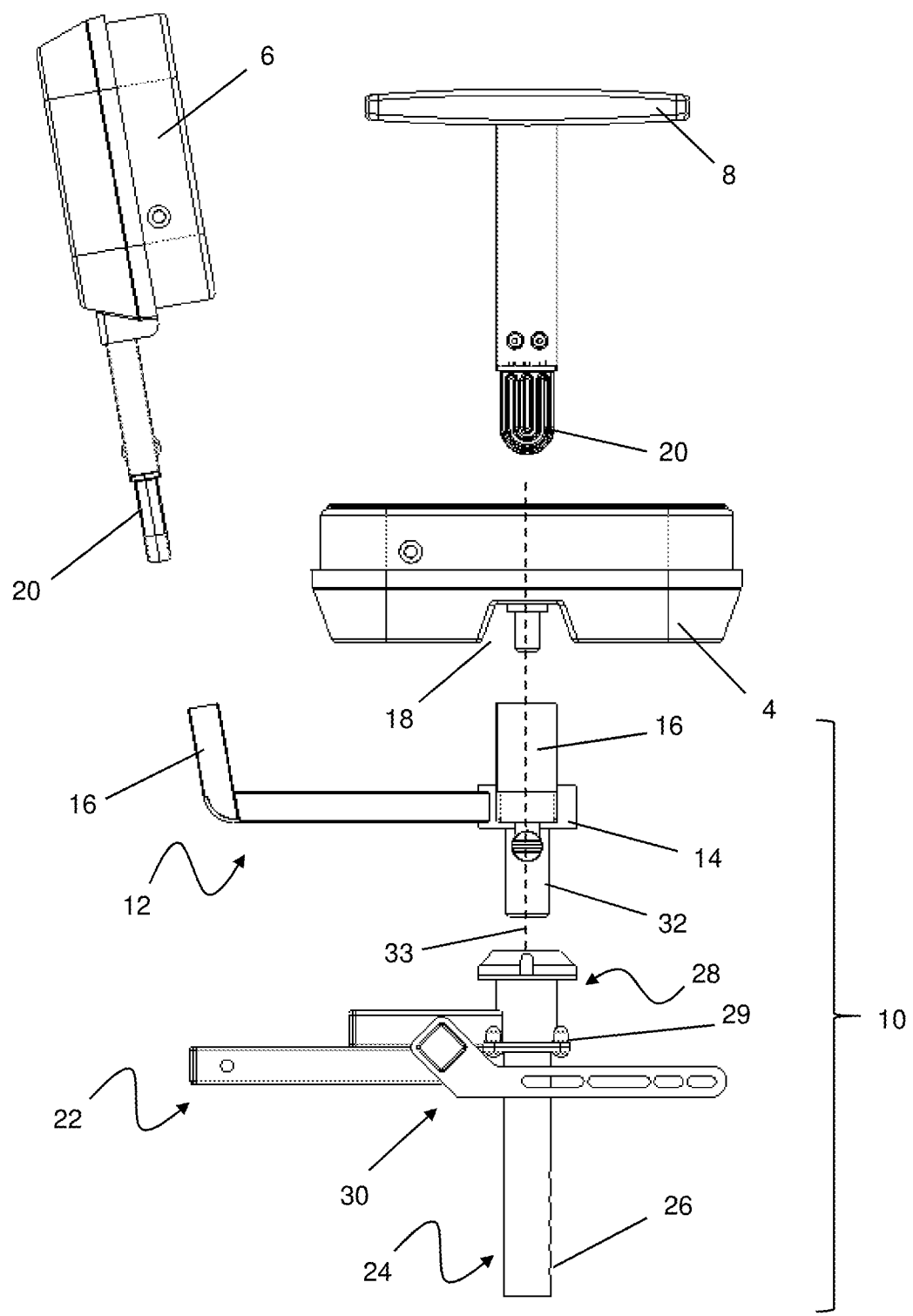
FIG. 3b shows an exploded side view of the seat assembly.

FIGS. 1a-3b show a seating assembly 2. The seating assembly 2 is configured to support a user of a vehicle in use (i.e. provide a seat). The seating assembly 2 is intended for use with a vehicle adapted for people with mobility issues, such as a mobility scooter.

The seating assembly 2 comprises a seat portion 4 configured to support the user's buttocks and legs in use. A back-rest 6 is provided at a rear side of the seat portion and is configured to supports the user's back in use, e.g. in a lumbar and/or thoracic region of the spine. Two arm-rests 8 are provided at the sides of the seat portion and are configured to supports the user's arms, e.g. forearms, in use.

The seat portion 4 and/or back-rest 6 and/or arm-rests 8 may comprise cushioning material or the like configured to support and provide comfort for the user. Conventional foam or other padding may be used.

The assembly 2 comprises a mounting assembly 10 configured to connect the assembly 2 to the vehicle.

The mounting assembly 10 comprises a yoke 12 configured to support the seat portion 4, the back-rest 6 and the arm-rests 8 in use, whilst allowing simple disassembly thereof by an end user.

The yoke 12 comprises a central portion 14 configured to engage and removably connect to the seat portion 4, e.g. on an underside of the seat. A plurality of arms 16 extend outwardly from the central portion 14 to support the back-rest 6 and the arm-rests 8 respectively (e.g. in a T-shaped arrangement). The central portion 14 thus comprises a junction for the arms, with the arms each having a proximal end at the central portion 14 and a distal end to which the back/arm rest 6/8 is attached.

The arms 16 are substantially L-shaped. The arms 16 comprise a substantially horizontal portion and an upwardly-extending (e.g. vertical) portion, with the back-rest/arm-rests connected to an end of the upwardly extending portions.

The seat portion 4 comprises a plurality of channels 18 formed in an underside thereof to receive the arms 16, i.e. part way along the length of each arm depending from the central portion 14. The arms 16 therefore lie flush with the underside of the seat portion 4 when assembled. The seat portion 4 may comprise a moulded base, thereby allowing convenient adaption to the shape of the arms 16.

The upwardly-extending portions of the arms are located beyond the perimeter of the seat portion 4.

The back-rest 6 and arm-rests 8 are removably attached to the yoke 12 (i.e. via the arms 16). The back-rest 6 and arm-rests 8 are therefore separable from the seat portion 4. The back-rest 6 and arm-rests 8 comprise a protrusion 20 configured to be received within the arms 16 (i.e. within a hollow section of the arms 16).

The back-rest 6 and arm-rests 8 may be secured to the arms 16 by a securing means, for example, fasteners or latches etc. Alternatively, the back-rest 6 and arm-rests 8 may be connected to the arm 16 by a loose/interference connection (i.e. by friction between the protrusions 20 and the arms 16). The protrusion in this example comprises a plurality of splines to provide a close frictional engagement in the hollow interior of the arms 16.

The mounting assembly 10 comprises a base portion 22 configured to be connected to the vehicle in use. The base portion 22 is configured to be connected to the vehicle in a permanent or semi-permanent fashion (i.e. the connection is maintained in day-to-day use). The base portion 22 is typically a permanent installation of the vehicle.

The base portion 22 comprises a pillar 24 mounted so as to extend upwardly from the vehicle. The pillar 24 comprises a plurality/series of apertures 26 along a lower portion thereof to receive fasteners or the like.

An upper end of the pillar 24 comprises a mounting plate 29 for mounting of both an upper pillar portion 28 and a lifting support structure 30 configured to allow lifting of the vehicle, e.g. using a hoist mechanism. The lifting structure comprises a cross bar 31 and brackets depending from the cross bar 31 at either side of the seat portion to allow attachment of webbing for lifting the vehicle. The specific details of the lifting structure and hoist mechanism are less relevant to the present invention and will not be described further. The upper pillar portion 28 may be affixed atop the pillar 24 using other conventional means and provides a formation arranged to receive the yoke 12 of the seat assembly as will be described below. The upper pillar portion 28 may be hollow or recessed in this regard, i.e. arranged to receive a protrusion of the yoke 12, or vice versa.

The yoke 12 is removably coupled to the base portion 22 when mounted. The yoke 12, seat portion 4, back-rest 6 and arm-rests 8 are therefore separable from the pillar 24 of the vehicle.

The yoke 12 comprises a shaft 32 on a lower side thereof. The shaft 32 is configured to be received within an opening of the upper end portion 28 of the pillar 24. The shaft 32 is loosely insertable in the pillar 24 to correctly align the yoke 12 with the pillar 24 for use. The yoke is thus loosely coupled on the pillar (i.e. held thereon primarily under action of the gravity) and is freely rotatable about an axis 33. The loose connection allows the seat yoke 12 and seat portion 4 etc. to be simply lifted off the vehicle.

The length of the shaft 32 is sufficient to prevent accidental toppling of the yoke off the pillar in normal use and its length may be, for example, at least two or three times the diameter of the shaft 32 and/or the diameter of the opening in the pillar. Both the pillar opening and shaft 32 are cylindrical in this example. Either or both of the opposing surfaces of the shaft 32 or pillar opening may be textured or profiled if desired to promote a particular frictional/interference engagement. However in the present example, the opposing surfaces are smooth to offer minimal resistance to rotation of the seat assembly when mounted on the pillar.

Figure 4:
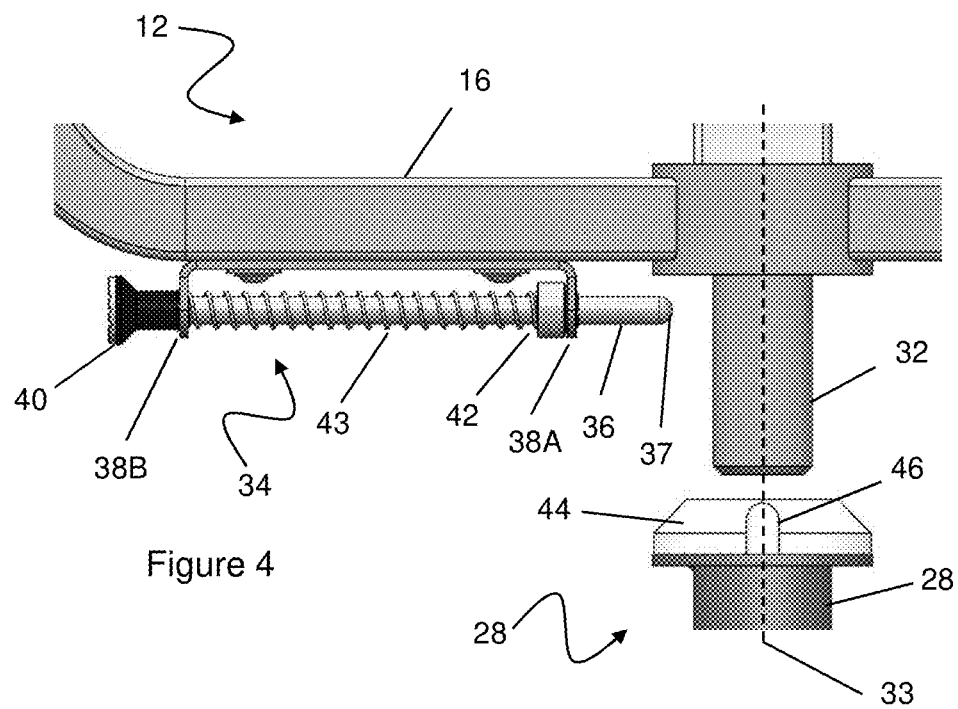
FIG. 4 shows a first close up frontal view of a rotational alignment mechanism during mounting.
Figure 5:
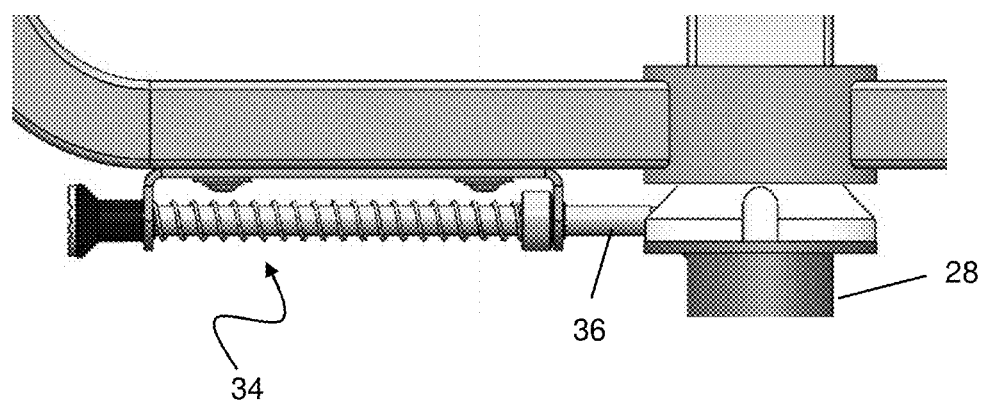
FIG. 5 shows a second close up frontal view of the rotational alignment mechanism once mounted for use.
Figure 6:
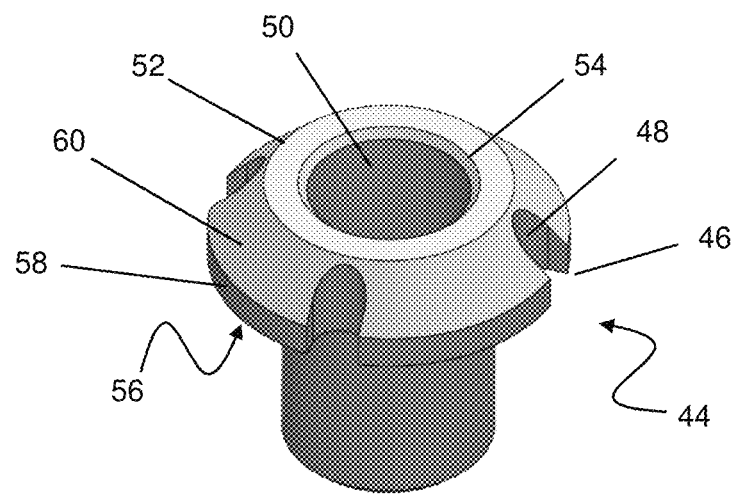
FIG. 6 shows an isometric view of an end of a pillar.

The interface between the yoke 12 and the pillar 24, i.e. the upper pillar portion 28, is shown in further detail in FIGS. 4-6.

An engagement mechanism 34 is provided on the yoke 12. The engagement mechanism may be mounted on an underside on one of the arms 16, e.g. one of the lateral arms supporting the arm-rests 8.

The engagement mechanism comprises a pin 36 resiliently biased toward the axis 33 and/or shaft 32. Therefore, as shown in FIG. 5, the pin 36 is biased toward engagement with the upper pillar portion 28 when the yoke 12 and the pillar 24 are connected.

The pin 36 extends along the horizontal portion of the arm 16 (i.e. in a direction transverse to the axis of rotation 33 of the yoke 12). The pin 36 is supported by a plurality of brackets 38 spaced along the arm 16. An end of the pin 36 comprises a handle 40, e.g. in the form of a knob, to allow the user to grasp and move the pin 36 against the biasing force. The handle 40 is located proximal the side edge of the seat portion 4 (e.g. adjacent the radially outer end of the armrest), thereby providing easy access for the user.

The pin 36 has a rounded end 37 for engagement with the upper pillar portion 38.

The pin comprises a stop member 42 configured to abut one of the brackets 38A to limit movement thereof in a direction to/from the axis 33. A spring 43 is operatively located between the stop member 42 and the other of the brackets 38B, thereby biasing the stop member into abutment with the bracket 38A. The user therefore pulls the pin 36 against the bias to disengage the pin 36 from the pillar 24.

The upper pillar portion 28 comprises a head formation 44 configured to engage the pin 36. The head portion 44 may be provided at the upper end of the pillar 24, e.g. at the upper extremity of upper pillar portion 28. The head formation may comprise a diameter/width dimension that is greater than the remainder of the upper pillar portion 28 and/or pillar 24. An outer/peripheral surface of the head formation 44 is radially beyond the end 37 of the pin in its at-rest condition shown in FIGS. 4 and 5.

The head portion 44 comprises a plurality of recesses 46 therein configured to receive the pin 36, i.e. the end 37 thereof. Engagement of the pin 36 and recesses 46 thereby prevent relative rotation of the yoke 12 and the pillar 24 (i.e. lock the angular position of the seat portion 4/yoke 12 about the axis 33). The recesses 46 are shaped to conform with the shape of the pin 36 (e.g. the same diameter/cross-sectional shape and/or curved profile), such that the pin 36 is snugly received therein. The snug fit can help to prevent any wobbling of the yoke 12 when locked.

The recesses 46 are angularly spaced about the pillar 24, thus providing a plurality of discrete, angularly spaced positions in which the yoke 12 may be rotationally locked/latched relative to the axis 33. This allows the user to rotate the seat assembly 2 to face different directions in use. For example, as shown in FIG. 6, a recess is provided for a forward facing position, a left facing position, a right facing position and rearward facing position. The recesses 46 are thus spaced by 90°. However, it can be appreciated that any number of recesses 46 may provided and the angular spacing/positions may vary according to the user's needs. A plurality of recesses may thus be angularly spaced as desired, although it is proposed that angular spacings of 45° or 90° may be preferred to accommodate at least forward-facing and lateral-facing positions.

The recesses act as latching abutments for the pin.

The recesses 46 extend in a direction substantially parallel to the axis of rotation 33 (herein referred to as the "axial direction"). The cross-section of the recesses 46 is substantially uniform and/or otherwise unobstructed along the axial direction. In other words, the recesses 46 have a diameter greater or equal to the diameter of the pin 36 along the axial direction. The recesses 46 therefore permit relative movement of the pin in an axial direction, even when rotationally latched.

The recesses 46 have an open/unobstructed end, and therefore the pin 36 may disengage the recesses 46 by sufficient axial movement thereof. This allows the user to lift off the yoke 12 whilst the pin 36 is engaged with the recesses 46. The shape of the recesses 46 therefore prevent relative rotation between pillar and the seat portion about the rotational axis 33 but permit mounting and/or unmounting of the seat portion in the axial direction.

The head portion comprises an aperture 50 therein configured to receive the yoke shaft 32. A rim 52 surrounds the aperture 50. The rim 52 comprises a substantially flat, annular upper surface arranged to bear the central portion 14 of the yoke thereon. An inwardly angled/chamfered surface 54 is provided between the aperture 50 and the rim 52 to help guide the shaft 32 into the aperture 50.

The head portion 44 comprises a low friction material, for example, nylon. In particular, the rim and the inner surface of the aperture 50 comprise the low friction material. The head portion 44 is received within the end portion 28 of the pillar 24 (see FIG. 8), e.g. as an insert member within a metallic supporting part of the end portion 28.

The head portion 44 comprises a flange 56 extending radially beyond the rim 52 and/or end portion 28 (i.e. in an annular fashion). The flange 56 comprises an outer/side wall 58. The flange 56 and/or head portion 44 comprises an angled/chamfered upper surface 60. The chamfered upper surface 60 extends at an oblique angle between the side wall 58 and the rim 52. The recesses 46 extend through the flange 56 (e.g. in a direction substantially perpendicular thereto).

The recesses 46 thus define arched or horse-shoe shaped discontinuities in the chamfered upper surface 60.

Figure 7:
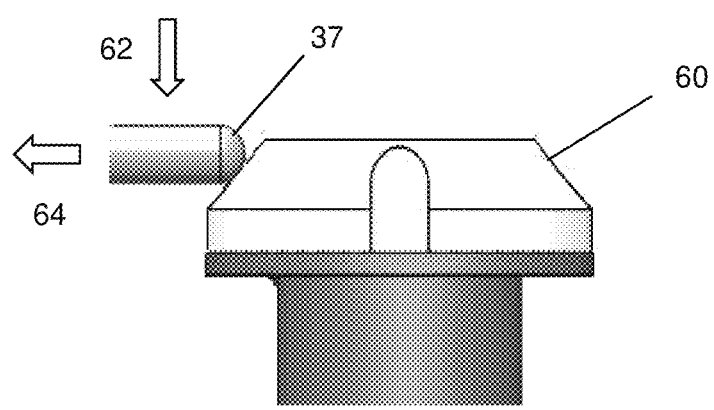
FIG. 7 shows a side view of the end of the pillar.

The chamfered surface 60 is configured to move the pin 36 in toward/away from the pillar 24 in a radial direction during movement of the pin 36 relative to the pillar 24 in an axial direction. For example, as shown in FIG. 7, as the pin 36 is moved in a downward axial direction 62, the chamfered surface 60 moves the pin 36 in an outward direction 64. The chamfered surface 60 therefore imparts a transverse movement of the pin 36 during axial movement of the pin 36 across the surface 60. The rounded head 37 of the pin allows the pin 36 to slide across the surface 60.

During downward axial movement, the chamfered surface 60 acts against the spring bias to move the pin 36 toward a retracted position, until it engages the side wall 64. At this point, further axial movement of the pin 36 is prevented as the head portion 44 engages the yoke (see FIG. 5). The engagement mechanism is therefore automatically retracted upon mounting of the yoke 12 onto the pillar 24. This means a user does not need to angularly align the pin 36 with a recess 48 during mounting of the yoke/seat assembly on the pillar 24.

The yoke 12 may then be rotated until the pin 36 is into alignment within one of the recesses 46, at which point the pin 36 will be biased into the recess 46 and the yoke is locked relative to the pillar 24. Such an arrangement therefore allows the user to place the seat onto the pillar 24 at any angle and then rotate the seat until it "snaps" into position. Additionally, this prevents any damage to the pin 36.

If the seat is placed onto the pillar 24 with the pin 36 aligned with one of the recesses 46, the pin 36 will merely slide down the recess 46 until the yoke 12 engages the pillar 24. The seat will therefore already be in a locked position.

Once assembled, should the user wish to rotate the seat, the user can pull the handle 40, thereby disengaging the pin 36 from the recess 46 and allowing rotation of the seat portion 4/yoke 12 relative to the pillar 24.

Figure 8:
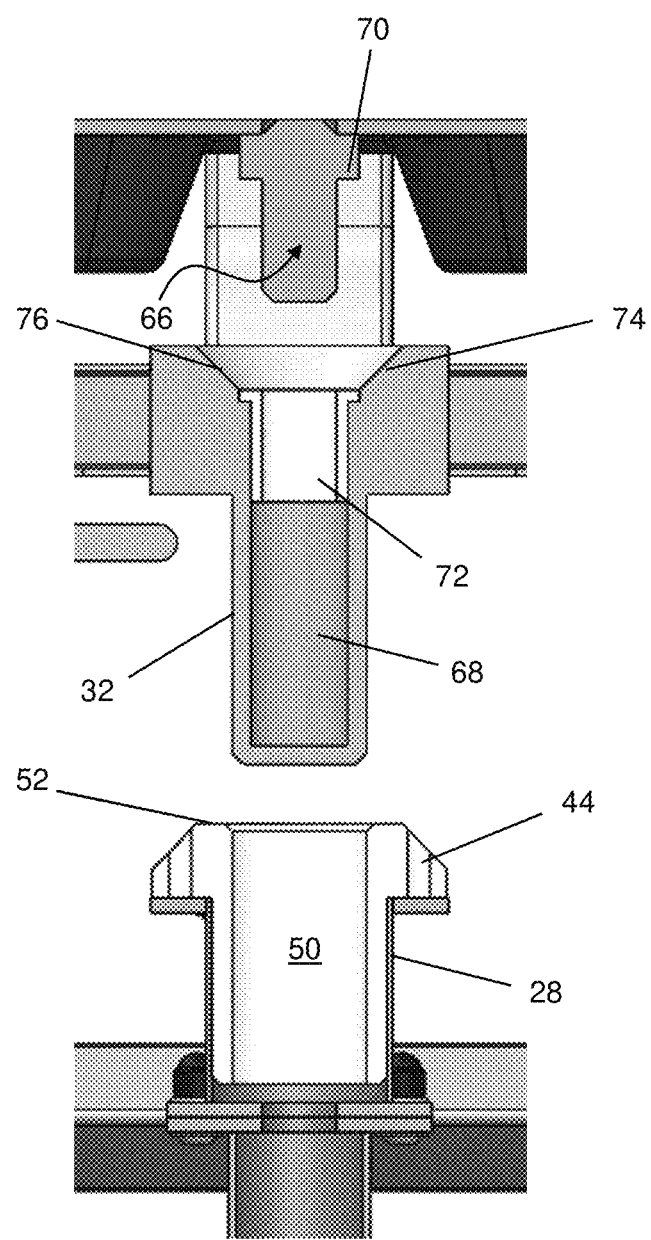
FIG. 8 shows a section view of the mounting assembly from the front.

The connections between the seat portion 4 and the yoke 12 is shown in further detail in FIG. 8.

The seat portion 4 comprises a protrusion/pin 66 at an underside thereof. The pin 66 is configured to be received within an aperture 68 in the yoke 12 (i.e. the central portion 14 thereof). The aperture 68 may extend, e.g. axially, within the yoke protrusion 32.

The pin 66 comprises a shoulder formation 70 of greater width proximal the seat portion and extends to a distal/free end. The free end may be chamfered.

A bearing member 72 is provided on the yoke, e.g. within the aperture 68, and is arranged to receive the pin. The bearing 72 takes the form of a simple annular member in this example, which comprises a low-friction material, for example, nylon. The bearing member 72 comprises an upper rim and an elongate/tubular section depending therefrom. The upper rim is shaped to abut the shoulder formation 70 when the pin is inserted into the bearing member. This has been found to provide an effective hard-wearing and low-friction bearing.

The bearing 72 in this example provides a neck formation at the entrance to the aperture 68, e.g. in the form of a collar formation. The aperture and bearing are tubular in form and the pin is cylindrical. Rotation between the seat portion 4 and yoke 12 is prevented by the interaction between the arms 16 and profiled underside of the seat portion 4. In other examples, the pin 66 and aperture/bearing could be of corresponding, non-circular form to prevent rotation between the seat portion 4 and the yoke 12. For example, the pin 66 and aperture could be polygonal/elliptical.

The yoke aperture 68 comprises an inwardly angled/chamfered surface 74 at an upper end thereof. The obliquely angled surface 74 is enlarged compared to the other chamfered surfaces described herein and acts to guide the pin 66 into the aperture. This is beneficial because the seat portion obscures the pin 66 during mounting onto the yoke and so the surface 74 assists the user in achieving the desired axial alignment between the pin 66 and aperture 68. The slight chamfer at the distal end of the pin 66 may also assist with the alignment.

The chamfered surface 74 provides a narrowing of the aperture 68. Therefore the bearing 72 has a reduced diameter compared with the upper/open end of the surface 74. The surface 74 and aperture 68 collectively define a funnel-like form that is closed at its lower end.

Similar to the connection between the yoke 12 and the pillar 24, the seat portion 4 is loosely mounted on the yoke 12 (i.e. held thereon primarily under action of the gravity alone). The seat portion 4 may therefore be separated from the yoke 12 by merely lifting it therefrom.

In this way, the yoke 12 and seat portion 4 can simply be stacked in sequence upon the pillar 24 in order to assemble the seat upon the mobility scooter.

The present invention allows convenient and simple attachment and detachment of the seat from a mobility scooter. The arrangement does not require the user to reach under the seat to unlatch a securing mechanism or fastener etc. The seat assembly can be attached to the pillar in any orientation and then rotated into a rotationally-latched position. This increases the ease of use for people with reduced mobility.

The seating assembly may be assembled or disassembled incrementally (i.e. attaching/removing the seat portion, back-rest, arm-rests, and yoke sequentially). This reduces the load the user is required to lift or hold.

The loose connections allow the user to simply lift each component way from another. This method is simple and easy to perform for people with reduced mobility. Additionally, this can be performed using a single hand. Furthermore none of the individual components are awkward to hold, nor do they require any significant leaning or stretching by the user to assemble or disassemble.

The chamfered apertures provide a self-locating arrangement. This mitigates the need to guide and/or observe the various components during assembly thereof.

What is claimed is:

1. A seat assembly for a mobility scooter comprising:
a seat portion for supporting an operator of the mobility scooter in use;
a yoke arranged to receive the seat portion and comprising a mounting formation for mounting of the yoke to a support member of the mobility scooter such that the yoke is removably mounted atop the support member and the seat portion is removably mounted atop the yoke in use, where the yoke comprises one or more attachment formation for releasable attachment of at least one of an arm-rest and a back-rest for the seat portion; and
where the seat portion is liftable off the yoke as a first component and the yoke is liftable off the support member as a further component when removing the seat assembly from the mobility scooter.

2. A seat assembly according to claim 1, where the mounting formation is provided on an underside of the yoke, such that the yoke is intermediate the seat portion and the support member in use.

3. A seat assembly according to claim 1, where the yoke is loosely mounted on the support member, such that lifting of the yoke can be effected by substantially lifting only against gravity.

4. A seat assembly according to claim 1, where either of the yoke mounting formation or the support member comprises a protrusion configured to be received by an aperture in the other of the mounting formation and the support member.

5. A seat assembly according to claim 1 where either of the seat portion or the yoke comprises a protrusion configured to be received by an aperture in the other of the seat portion and the yoke.

6. A seat assembly according to claim 5, where either of the aperture or the protrusion comprises a bearing formation for supporting rotation of the other of the aperture and protrusion in a weight bearing relationship when mounted.

7. A seat assembly according to claim 5, where one or both of the aperture and the protrusion comprises a low friction material.

8. A seat assembly according to claim 5, where the aperture or the protrusion comprises a chamfered edge or opening configured to guide the protrusion into the aperture.

9. A seat assembly according to claim 8, where the aperture is funnel shaped in form, having a chamfered section and a cylindrical section.

10. A seat assembly according to claim 1, wherein the yoke comprises both a protrusion for engaging an aperture of the support member and also an aperture for receiving a protrusion on the underside of the seat portion.

11. A seat assembly according to claim 10, where the aperture of the yoke is axially aligned with the protrusion of the yoke.

12. A seat assembly according to claim 10, where the aperture of the yoke opens into a hollow interior of the protrusion of the yoke.

13. A seat assembly according to claim 1, comprising two arm rests and the back rest, all of which are removably and/or releasably mounted to the yoke.

14. A seat assembly for a mobility scooter comprising:
a pillar configured to connect to the scooter in use;
a seat portion for supporting an operator of the mobility scooter in use, the seat portion removably mounted to the pillar and rotatable relative thereto about an axis when mounted;
one of the pillar and the seat portion comprising an engagement member configured to releasably engage at least one alignment formation provided at an angular position on the other of the pillar and the seat portion; and
where the alignment formation is shaped such that when the engagement member is engaged therewith, relative rotation between the pillar and the seat portion about the axis is prevented and mounting/unmounting of the seat portion in an axial direction is permitted.

15. A seat assembly according to claim 14, where the alignment formation comprises an axially aligned abutment surface having a depth in a radial direction.

16. A seat assembly according to claim 15, wherein the alignment formation is provided as a discontinuity in a circumferential surface disposed about the axis.

17. A seat assembly according to claim 14, where the alignment member comprises one or more recess that is open in an axial direction.

18. A seat assembly according to claim 17, where the recess is also open in a radial direction facing outwards from the axis.

19. A seat assembly according to claim 17, where the recess comprises one or both of a substantially uniform cross-section and a width greater than or equal to a width of the engagement mechanism along the axial direction.

20. A seat assembly according to claim 14, where the engagement member is comprised in an engagement mechanism and the engagement member is moveable and/or resiliently biased into engagement with the alignment formation.

21. A seat assembly according to claim 14, where the engagement member is selectively moveable in a radial direction between engaged and retracted conditions.

22. A seat assembly according to claim 14, where the other of the pillar and the seat portion comprises a cam surface that is obliquely angled relative to the axis, the cam surface configured to urge the engagement member into a disengaged condition during relative axial movement of the pillar and seat portion.

23. A seat assembly according to claim 22, wherein the cam surface is absent at the alignment formation and/or where the alignment formation comprises a discontinuity in the cam surface.

24. A seat assembly according to claim 14, comprising a yoke, the yoke provided intermediate the seat portion and the pillar and removably connected to both the seat portion and the pillar, the engagement mechanism being provided on the yoke.

25. A seat assembly according to claim 14, comprising a plurality of alignment formations angularly spaced about the axis.

* * * * *